No. 611,864. Patented Oct. 4, 1898.
C. MATHISEN.
TIRE SETTING MACHINE.
(Application filed May 7, 1898.)
(No Model.)

WITNESSES:
Edward Thorpe
Geo. G. Hoskin

INVENTOR
C. Mathisen
BY
ATTORNEYS.

THE NORRIS PETERS CO., PHOTO-LITHO., WASHINGTON, D. C.

UNITED STATES PATENT OFFICE.

CHRISTIAN MATHISEN, OF FREDERICKSBURG, TEXAS.

TIRE-SETTING MACHINE.

SPECIFICATION forming part of Letters Patent No. 611,864, dated October 4, 1898.

Application filed May 7, 1898. Serial No. 680,040. (No model.)

*To all whom it may concern:*

Be it known that I, CHRISTIAN MATHISEN, of Fredericksburg, in the county of Gillespie and State of Texas, have invented a new and Improved Tire-Setting Machine, of which the following is a full, clear, and exact description.

The object of the invention is to provide certain new and useful improvements in tire-setting machines, whereby the tire can be set cold upon the rim in a very short time and with great ease on the part of the operator.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
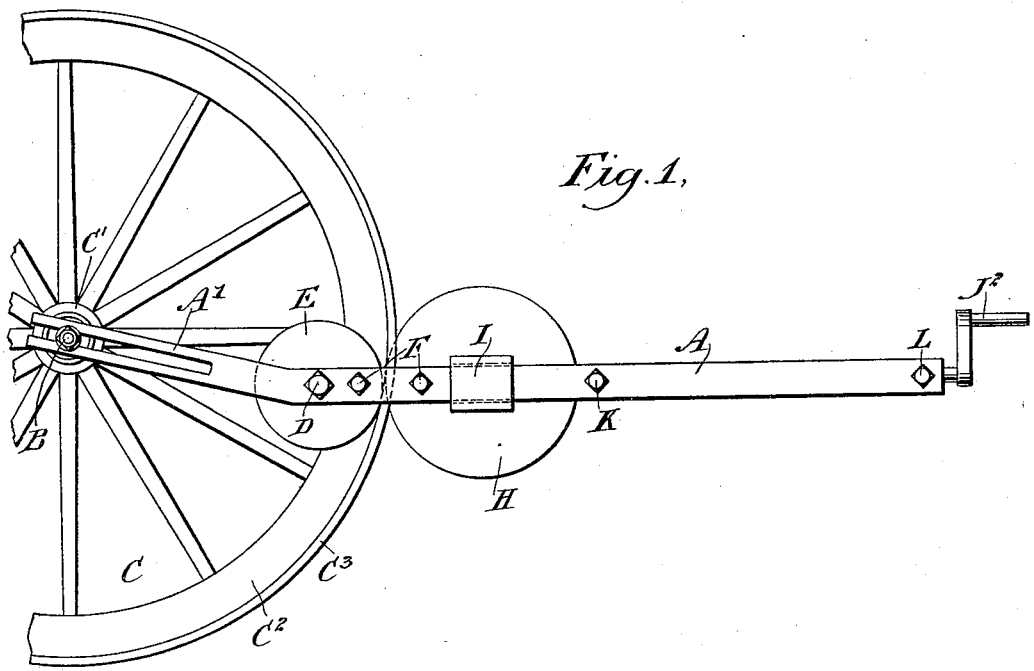
Figure 2:
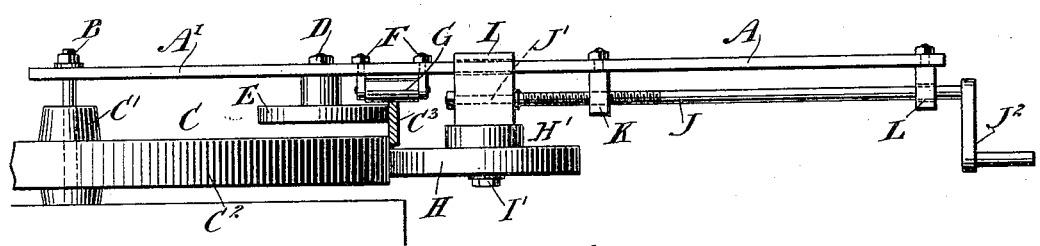
Figure 3:
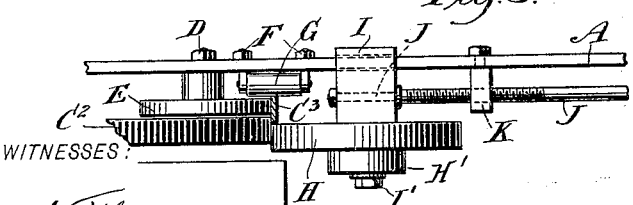

Figure 1 is a plan view of the improvement as applied. Fig. 2 is a side elevation of the same with the tire in section, and Fig. 3 is a like view of the improvement as applied on a narrow tire.

The improved tire-setting machine is provided with a lever A, having its inner angular end A' slotted for engagement with a pivot B, temporarily secured in the hub C' of the wheel C, adapted to receive at its rim $C^2$ a tire $C^3$. The pivot B forms the fulcrum of the lever A, so that the latter can be swung around over the wheel, which rests on a suitable bench or other support, and at the same time the lever A can be swung downwardly, with the pivot B as a fulcrum to allow both motions. On the lever A is secured a stud D, on which is journaled a wheel E, forming an internal presser for the inside of the tire $C^3$, so as to press the latter outwardly for the purpose hereinafter more fully described.

On the lever A are secured studs F, in which is journaled a roller G, forming a bearer for bearing down upon the top edge of the tire $C^3$ to force the latter onto the rim, as hereinafter more fully explained. A roller H forms an external presser for engaging and pressing the rim $C^2$ of the wheel inwardly at the time the internal pressure forces the tire $C^3$ outward, and the bearer G bears down on the tire and moves the latter upon the rim. The roller H is journaled on the lower end of a stud I', carried by a slide I, fitted to slide longitudinally on the lever A, said slide being engaged by the inner end of a screw-rod J, screwing in a nut K, carried by the lever A. The outer end of the screw-rod J is journaled in a bearing L, carried by the lever A, and on the extreme outer end of said screw-rod is secured a crank-arm $J^2$, adapted to be taken hold of by the operator to turn the screw-rod J and screw the same inward or outward in its nut K to move the roller H with more or less force in frictional contact with the rim $C^2$ of the wheel C.

The device is used as follows: The wheel C is placed in a horizontal position on a suitable support. Then the tire $C^3$ is placed by hand onto the rim $C^2$ as far as possible. Then the pivot B is secured to the hub and the lever A is fulcrumed on the pivot B, the roller or internal bearer E being in engagement with the inside of the tire, the bearer G being on the top of the tire. The screw-rod J is now turned to move the roller H in contact with the periphery of the rim $C^2$ below the edge of the tire $C^3$ and almost directly opposite the bearer or roller E. It is evident that when the operator now manipulates the lever A and the screw-rod J pressure is exerted in an outward direction on the tire $C^3$ by the bearer E, and at the same time an inward pressure is exerted at the roller H on the rim $C^2$, so that the tire can readily pass upon the rim at the particular point by the downward pressure of the bearer G, moved in this direction by the operator bearing down on the lever A. The lever A is gradually swung around over the face of the wheel, the operator bearing down on the lever, as described, so that the tire $C^3$ is gradually forced onto the rim of the wheel. It is understood that the internal bearer, the external bearer, and the bearer G all move with the lever A, so that the several parts operate in unison for the purpose mentioned.

The angular end A' of the lever A keeps the machine from turning over when in use. The roller H is provided with a hub H' to permit of bringing the roller in proper position when reversed and when the device is used on a narrow tire, as will be readily understood by reference to Fig. 3.

Having thus fully described my invention,

I claim as new and desire to secure by Letters Patent—

1. A tire-setting machine, comprising a lever, a roller carried by the lever for engaging the inner side of the tire, a bearing-roller carried by the lever for engaging with the edge of a tire and a roller carried by the lever for engaging the periphery of the wheel-rim, substantially as specified.

2. A tire-setting machine provided with an internal bearer for the inside of the tire, a bearer for bearing on the edge of the tire, an external bearer for the rim, and a lever carrying said bearers and bearer, and adapted to be fulcrumed at the center of the machine to be swung over the same and toward the face of the wheel, substantially as shown and described.

3. A tire-setting machine, comprising a lever adapted to be temporarily fulcrumed at the hub of a wheel, a roller journaled on said lever and adapted to engage the inside of the tire, a bearer journaled on said lever, and adapted to engage the edge of the tire, a slide adjustably held on the lever, and a second roller journaled on said slide, and adapted to engage the peripheral surface of the rim of the wheel, substantially as shown and described.

4. A tire-setting machine, comprising a lever adapted to be temporarily fulcrumed at the hub of a wheel, a roller journaled on said lever and adapted to engage the inside of the tire, a bearer journaled on said lever, and adapted to engage the edge of the tire, a slide adjustably held on the lever, a second roller journaled on said slide and adapted to engage the peripheral surface of the rim of the wheel, and means, substantially as described, for moving said slide on said lever, as set forth.

5. A tire-setting machine, comprising a pivot temporarily fastened at the hub of a wheel, a lever having an angular, slotted end for loosely engaging said pivot, to permit of swinging the lever over the face of the wheel and toward the same, a roller journaled on said lever and adapted to engage the edge of the tire, a slide adjustably held on the lever, a second roller journaled on said slide and adapted to engage the peripheral surface of the rim of the wheel, and means, substantially as described, for moving said slide on said lever, as set forth.

6. A tire-setting machine, comprising a lever, a fulcrum-pin adjustable along the length of the lever near one end and adapted to be secured to the wheel-hub, two rollers carried by the lever and adapted to respectively engage the inner periphery of the tire and the outer periphery of the wheel-rim, and a bearing-roller adapted to engage the edge of the tire.

7. A tire-setting machine, comprising a lever, a fulcrum-pin adjustable along the length of the lever near one end and adapted to be secured to the wheel-hub, and two rollers carried by the lever and adapted to respectively engage the inner periphery of the tire and the outer periphery of the wheel-rim.

8. A tire-setting machine, comprising a lever adapted to be fulcrumed on the wheel-center, two rollers carried by the lever and adapted to respectively engage the inner periphery of the tire and the outer periphery of the wheel-rim, and means for forcing the tire laterally upon the wheel-rim.

9. A tire-setting machine, comprising a lever adapted to be fulcrumed on the wheel-center, two rollers carried by the lever and adapted to respectively engage the inner periphery of the tire and the outer periphery of the wheel-rim, means for moving one of said rollers radially, and means for forcing the tire laterally upon the rim.

10. A tire-setting machine, comprising a lever adapted to be fulcrumed on the wheel-center, two rollers carried by the lever and adapted to respectively engage the inner periphery of the tire, and the outer periphery of the wheel-rim, means for forcing one of said rollers radially, and a bearing-roller adapted to engage the edge of the tire.

CHRISTIAN MATHISEN.

Witnesses:
CHARLES SCHWARZ,
JAMES THOMAS ESTILL.